(12) United States Patent
Tait et al.

(10) Patent No.: US 9,361,303 B2
(45) Date of Patent: Jun. 7, 2016

(54) SYSTEMS AND METHODS TO FACILITATE A REQUEST FOR OILFIELD SERVICES USING A DATA TRANSFER PROTOCOL

(75) Inventors: Colin A. Tait, Tomball, TX (US); Robert A. Schave, Conroe, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 198 days.

(21) Appl. No.: 14/237,218

(22) PCT Filed: Dec. 20, 2011

(86) PCT No.: PCT/US2011/066235
§ 371 (c)(1),
(2), (4) Date: Feb. 5, 2014

(87) PCT Pub. No.: WO2013/095395
PCT Pub. Date: Jun. 27, 2013

(65) Prior Publication Data
US 2014/0188789 A1    Jul. 3, 2014

(51) Int. Cl.
*G06F 7/00* (2006.01)
*G06F 17/30* (2006.01)
*G06Q 10/08* (2012.01)
*G06Q 30/06* (2012.01)

(52) U.S. Cl.
CPC .... *G06F 17/30076* (2013.01); *G06F 17/30368* (2013.01); *G06Q 10/0875* (2013.01); *G06Q 30/0601* (2013.01)

(58) Field of Classification Search
None
See application file for complete search history.

(56) References Cited

U.S. PATENT DOCUMENTS

| 6,519,568 | B1 | 2/2003 | Harvey et al. |
| 6,826,492 | B2 | 11/2004 | Newman |
| 2002/0065736 | A1 | 5/2002 | Willner et al. |
| 2002/0162010 | A1* | 10/2002 | Allen ............... G06F 11/2294 726/26 |
| 2003/0074401 | A1 | 4/2003 | Connell et al. |
| 2004/0078281 | A1 | 4/2004 | Morley et al. |
| 2005/0049885 | A1 | 3/2005 | Johnson et al. |

(Continued)

FOREIGN PATENT DOCUMENTS

JP    2007226721    9/2007

OTHER PUBLICATIONS

Julian Pickering et al: "A Standard Real-Time Information Architecture for Drilling and Completions," Nov. 1, 2007, pp. 1-5, XP055199147, URL:https://www.onepetro.org/download/conference-paper/SPE-110388-MS?id=conference-paper/SPE-110388-MS [retrieved on Jun. 30, 2015].

(Continued)

*Primary Examiner* — Uyen Le

(57) ABSTRACT

Facilitating a request for oilfield services. At least some of the illustrative embodiments are systems including a data store to receive a services request from a services requestor through a data transfer protocol interface and update an entry in the data store to indicate one or more parameters associated with the services request. The system also includes a monitor tool and a configuration file creator. The monitor tool detects an update to the data store and, if an update is detected, verifies the correctness of the services request that corresponds to the detected update. The configuration file creator detects an update to the data store and, if an update is detected, identifies an affected receiving system, determines a configuration file format for the affected receiving system, and generates a configuration file for the services request having the determined format for the affected receiving system.

19 Claims, 5 Drawing Sheets

(56) References Cited

U.S. PATENT DOCUMENTS

| | | |
|---|---|---|
| 2008/0228503 A1 | 9/2008 | Buchheit |
| 2010/0042449 A1 | 2/2010 | Thomas |
| 2011/0153726 A1* | 6/2011 | Heeren .................. G06F 9/541 709/203 |

OTHER PUBLICATIONS

Hamayun Raja et al: "Workflows and Methods to Optimize Well Construction through a Collaborative Environment", EPO Form 1703 01.91TRI, Apr. 1, 2011, pp. 1-12, XP055199155, URL:https://www.onepetro.org/download/conference-paper/SPE-143600-MS?id=conference-paper/SPE-143600-MS [retrieved on Jun. 30, 2015].

N R Deeks et al: 11 WITSML Changing the Face of Real-Time 11, Feb. 1, 2008, pp. 1-6, XP055199157, Retrieved from the Internet: URL:http://dossier-services.internal.epo.org/application/EPO-internal/EP/11818583/?serveAsMime=application/pdf;overlay=true&inline=true&booklet=false&language=en&clientid=diplus [retrieved on Jun. 30, 2015].

International Search Report PCT/US2011/066235 mailed Dec. 20, 2011.

* cited by examiner

SYSTEMS AND METHODS TO FACILITATE A REQUEST FOR OILFIELD SERVICES USING A DATA TRANSFER PROTOCOL

CROSS-REFERENCE TO RELATED APPLICATIONS

None.

BACKGROUND

Oilfield equipment or services may need to be ordered for use at a hydrocarbon wellsite during various stages of hydrocarbon operations such as drilling, completion, production and the like. In such a situation, an order is placed with a vendor, for example, by a phone call to the vendor or by emailing a spreadsheet to the vendor. The vendor then manually enters the order in the receiving system for processing.

However, the above procedure for ordering services and processing orders for services is prone to errors. For example, the requestor may order a component or tool that is incompatible with other components or tools currently being used at the rig site (e.g., incorrect dimensions, incorrect tool for a particular task). In such a case, no reliable safeguard exists to correct the erroneous order prior to sending the order to a vendor or receiver. As another example, the requestor may send a component order to a receiver that is incapable of processing or filling at least a portion of the order (e.g., certain components have been ordered from a receiver that does not or cannot provide those components). In such a case, a delay may result before the requestor is made aware of the erroneous order and can reorder the components from the proper receiver. As yet another example, the receiver may require that orders be formatted in a specific way or that certain information be provided by the requestor for certain components. The requestor may mistakenly use the wrong format or not include all the required information regarding a particular component, further causing confusion and delays. In the above situations, various mistakes may not be discovered until after the receiver has supplied the requestor with the ordered services, resulting in increased costs and long delays to various operations as the order is corrected.

BRIEF DESCRIPTION OF THE DRAWINGS

For a detailed description of exemplary embodiments, reference will now be made to the accompanying drawings in which.

NOTATION AND NOMENCLATURE

Figure 1:
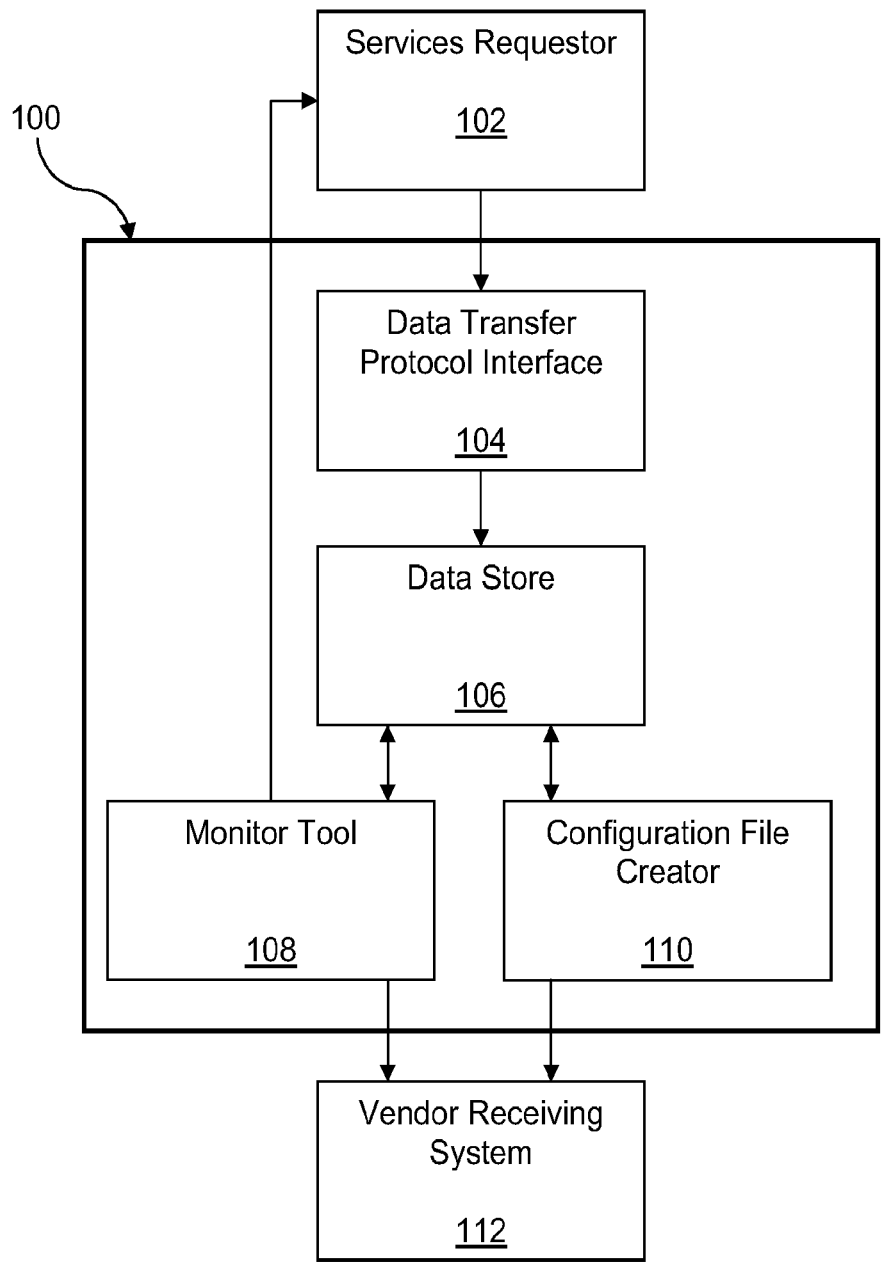
FIG. 1 shows a system for facilitating a request for oilfield services using a data transfer protocol in accordance with at least some embodiments.

Certain terms are used throughout the following description and claims to refer to particular components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

As used herein, the terms "services" or "oilfield services" shall mean parts, services, or other purchasable items, particularly for use in oilfield operations such as drilling, completion, and production.

As used herein, the terms "requestor" or "requesting system" shall mean a party that requests oilfield services.

As used herein, the term "receiver" or "receiving system" shall mean a party that receives a request for oilfield services, regardless of whether that party actually processes and fills the request or passes the request onto a third party for processing and filling.

As used herein, the term "wellsite system" shall mean equipment installed or in use at a hydrocarbon wellsite, regardless of what stage of hydrocarbon extraction the equipment is used for. For example, drilling equipment, completion equipment, and production equipment are all part of the wellsite system.

Detailed Description

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to systems and related methods to facilitate a request for oilfield services using a data transfer protocol. More particularly, various embodiments are directed to receiving a services request from a services requestor that is transmitted using a data transfer protocol, such as the wellsite information transfer standard markup language (WITSML), which is a standard for transmitting technical data between organizations in the petroleum industry. The request is received at a data transfer protocol interface that passes the request to a data store, such as a database server, where the request is subsequently stored (e.g., as a new or updated database entry).

In some embodiments, a monitor tool monitors the data store for updates to existing entries and/or the addition of new entries, both of which may correspond to a request for services received from a services requestor. The monitor tool may review a new request for correctness using business rules that correspond to the particular data type of the request. For example, requests may enter the data store from different external systems, each of which may have a set data protocol. The monitor tool reviews the requests as they enter the data store to ensure that the requests conform to the data protocol of the associated external system. The monitor tool may then transform the request into a native format that a configuration file creator understands. This transformation may act as an audit for both the correctness and validity of the request, which is then processed and stored in the data store. Thus, regardless of the data format of requests when received, requests may be stored in the data store in a similar manner.

The monitor tool may also monitor the wellsite system to ensure that the new request corresponds to services that would actually be needed given the various components in use at the wellsite system. For example, the monitor tool compares units of measurement, sizes of components and the like to those which are in use at the wellsite system. In the event that the monitor tool determines that the new request is incorrect (e.g., for the reasons given above), the monitor tool generates a notification to the requestor that informs the requestor that one or more aspects of the request need to be corrected. The notification may be generated via, for example, a Short Message Service (SMS) text message, an e-mail, a voice mail or the like. The monitor tool may also generate an invoice for the requested services (or, alternately, cause an invoicing system to generate an invoice for the requested services) if the correctness of the new request is verified.

In accordance with various embodiments, a configuration file creator also monitors the data store for updates to existing entries and/or the addition of new entries, both of which may correspond to a request for services received from a requestor. Based on identifying a new request for services, the configuration file creator generates a configuration file for an appropriate vendor receiving system. Many receiving systems (e.g., oilfield service providers) may be associated with a single wellsite system, and thus the configuration file creator determines the appropriate receiving system(s) for a given new request. In some cases, configuration files for multiple receiving systems may be generated based on a single new request. The configuration file creator formats each configuration file to correspond to a format desired by the receiving system for that configuration file. For example, the configuration file creator maintains a lookup table that specifies a request format for each particular receiving system. Such a lookup table may be created or updated when new receiving systems are added. The configuration file creator may optionally review the configuration prior to being transmitted to the receiving system. In some embodiments, when the receiving system accesses the configuration file, the associated order is entered into an order processing system of the receiving system.

Additionally, as explained above, requests are stored in the data store in a similar manner regardless of the initial data format of the request, which enables the configuration file creator to create configuration files in the same manner regardless of the data format of the request. This allows for data aggregation to occur for all request formats, such that the data store is the main receiver of all requests, which simplifies processing these requests. The storage of data in the data store in an aggregated format allows for the system to become a request aggregator and receive data in many formats. This process is enabled by the monitor tool understand many different data formats and how to transform these formats into an aggregated format in which the data can be stored Thus, in accordance with various embodiments, once a request for oilfield services is generated at a wellsite, the process of transmitting the request to the appropriate receiving service(s) is automated and the communication between a requestor and a receiver is simplified. Additionally, each request may be efficiently checked for correctness, which reduces expenditures and delays resulting from an incorrect service order.

Turning now to FIG. 1, a system 100 to facilitate a request for oilfield services is shown. A services requestor 102 couples to the system 100, for example through a data transfer protocol interface 104. The data transfer protocol interface 104 provides data from the services requestor 102 to a data store 106, such as a database server. A monitor tool 108 monitors the data store 106 for new entries or updates to existing entries, either of which may correspond to a new request for services. Similarly, a configuration file creator 110 monitors the data store 106 for new entries or updates to existing entries, which may correspond to a new request for services. The monitor tool 108 may provide notifications of certain events (e.g., an error in a services request) to both the services requestor 102 and a vendor receiving system 112. The configuration file creator 110 determines that a new request is associated with the vendor receiving system 112 and, as a result, provides a configuration file to the vendor receiving system 112, which the vendor receiving system 112 may then process as a request for services.

The services requestor 102 may comprise a web browser, application, applet, mobile phone application or the like that a hydrocarbon wellsite operator (i.e., the requestor) accesses to request oilfield services. For example, the requestor may sign in to an application that allows them to fill in a form requesting various services. In some embodiments, the application form may limit the requestor to only services that are currently available from vendor receiving systems 112 that are coupled to the system 100. However, as will be explained in more detail below, additional vendor receiving systems 112 may be coupled to the system 100 as needed. Thus, if a particular requested service is unavailable, the requestor is made aware of a need to add additional vendor receiving systems 112 so that the requestor's request may be fulfilled.

The data transfer protocol interface 104 serves as a communication interface between the services requestor 102 and the data store 106. For example, data such as a services request may be transferred over the data transfer protocol interface 104 using WITSML, hypertext markup language (HTML), extensible markup language (XML) or the like. Further, various transfer protocols such as hypertext transfer protocol (HTTP) may be employed by the data transfer protocol interface 104. One skilled in the art appreciates that the above interfaces are exemplary, and any communication interface that enables the transmission of a request for oilfield services is within the scope of the present disclosure.

The data store 106 may comprise a database server, or other data storage device, that allows data received through the data transfer protocol interface 104 to be stored for monitoring, access or retrieval. The data store 106 may include a number of entries that correspond to requests for oilfield services received through the data transfer protocol interface 104. In some cases, when a new request is received through the data transfer protocol interface 104, a new entry is generated in the data store 106 that corresponds to the new request. In other cases, an entry in the data store 106 is updated (e.g., various fields of the entry may be altered based on data of the new request or a particular field may be altered to indicate that the entry corresponds to a new request) to contain data that corresponds to the new request.

In addition to containing entries corresponding to requests for oilfield services, the data store 106 may also store audit logs that track various activities/events such that, if necessary, a detailed description of events may be recovered. For example, the audit logs may include information such as where the request originated from, the initial data format of the request, where the original data file of the request is stored, when the request was received, whether notifications were sent as a result of receiving the request, whether a configuration file was created, what data was in the configuration file, or whether the configuration file was sent to an external system. Various events may be marked with a time and date stamp and a user ID may be captured when a receiving system accesses a configuration file or when a requesting system generates a request. User IDs may also be captured if an update is made to the data store along with the data changes that were made. User IDs may include a system ID or an individual's user ID who is logged onto the system 100 and invoking a change. In accordance with various embodiments, the audit logs facilitate subsequent forensic analysis, if necessary, to rebuild the process of events that led to an incident. For example, it may be possible to show how a request was created, where the request originated from, and how the request was subsequently handled.

The monitor tool 108 monitors the data store 106 (e.g., through periodic or continuous queries) to detect updates to existing entries or the addition of new entries, both of which may correspond to a request for services generated by the services requestor 102. When the monitor tool 108 detects a change to the data store 106 that corresponds with a new request for services, the monitor tool 108 reviews the new request for correctness using business rules that correspond to the particular data type of the request. For example, a new request may be received from the services requestor 102 in the data format that the services requestor 102 uses (e.g., a request for drilling services using a requestor's XML format). The request is then stored in the data store 106, which causes the monitor tool 108 to examine the request and transform the request into a native format, such that the request can be stored and understood by, for example, the configuration file creator 110. This transformation of the request from an external system format to a native request format enables all requests to be acted on in a similar manner. In some embodiments, the monitor tool 108 also monitors the wellsite system (not shown) to ensure that new requests are for services that would actually be needed considering the various components in use at the wellsite system. For example, in some embodiments, the monitor tool 108 compares units of measurement, sizes of components and the like to those which are in use at the wellsite system for correctness. If a requested component is incompatible with various components in use at the wellsite system, the new request may be erroneous.

In the event that the monitor tool 108 determines that the new request is incorrect or erroneous (e.g., for the reasons given above), the monitor tool 108 generates a notification to the services requestor 102 that informs the requestor 102 that one or more aspects of the request need to be corrected. The notification may be generated via, for example, a Short Message Service (SMS) text message, an e-mail, a voice mail or the like. In some cases, the monitor tool 108 also forwards the notification to the receiving system 112 or generates a different notification for the receiving system 112. If the monitor tool 108 verifies the correctness of the new request, the monitor tool 108 may also generate an invoice for the requested services (or, alternately, cause an invoicing system (not shown) to generate an invoice for the requested services).

Similar to the monitor tool 108, the configuration file creator 110 monitors the data store 106 (e.g., through periodic or continuous queries) to detect updates to existing entries or the addition of new entries, both of which may correspond to a request for services generated by the services requestor 102. When the configuration file creator 110 detects a change to the data store 106 that corresponds with a new request for services, the configuration file creator 110 determines whether the vendor receiving system 112 is affected by the new request. For example, if the request is for services that the receiving system 112 does not provide, then the receiving system 112 is not affected by the new request. On the other hand, if the request is for services that the receiving system 112 provides, then the receiving system 112 is affected by the new request. In some embodiments, multiple receiving systems are coupled to the system 100, and thus the configuration file creator 110, and a particular request may affect more than one receiving system.

If the configuration file creator 110 determines that the receiving system 112 is affected by the new request, the configuration file creator 110 determines a configuration file format for the receiving system (e.g., by accessing a look up table containing a preferred configuration file format for each receiving system coupled to the configuration file creator 110). The configuration file format specifies a request format that the receiving system 112 will be capable of processing as an order. The configuration file creator 110 formats the new request into an appropriate configuration file for the receiving system 112. In some cases, the receiving system 112 accesses the configuration file creator 110 (e.g., periodically or continuously) to retrieve the configuration file, while in other embodiments, the configuration file creator 110 transmits the configuration file to the receiving system. In some embodiments, the receiving system 112 retrieves or receives the configuration file only after being authenticated, for example by logging into a web application and/or presenting appropriate credentials to the configuration file creator 110. After receiving the configuration file, the receiving system 112 processes the order.

Figure 2:
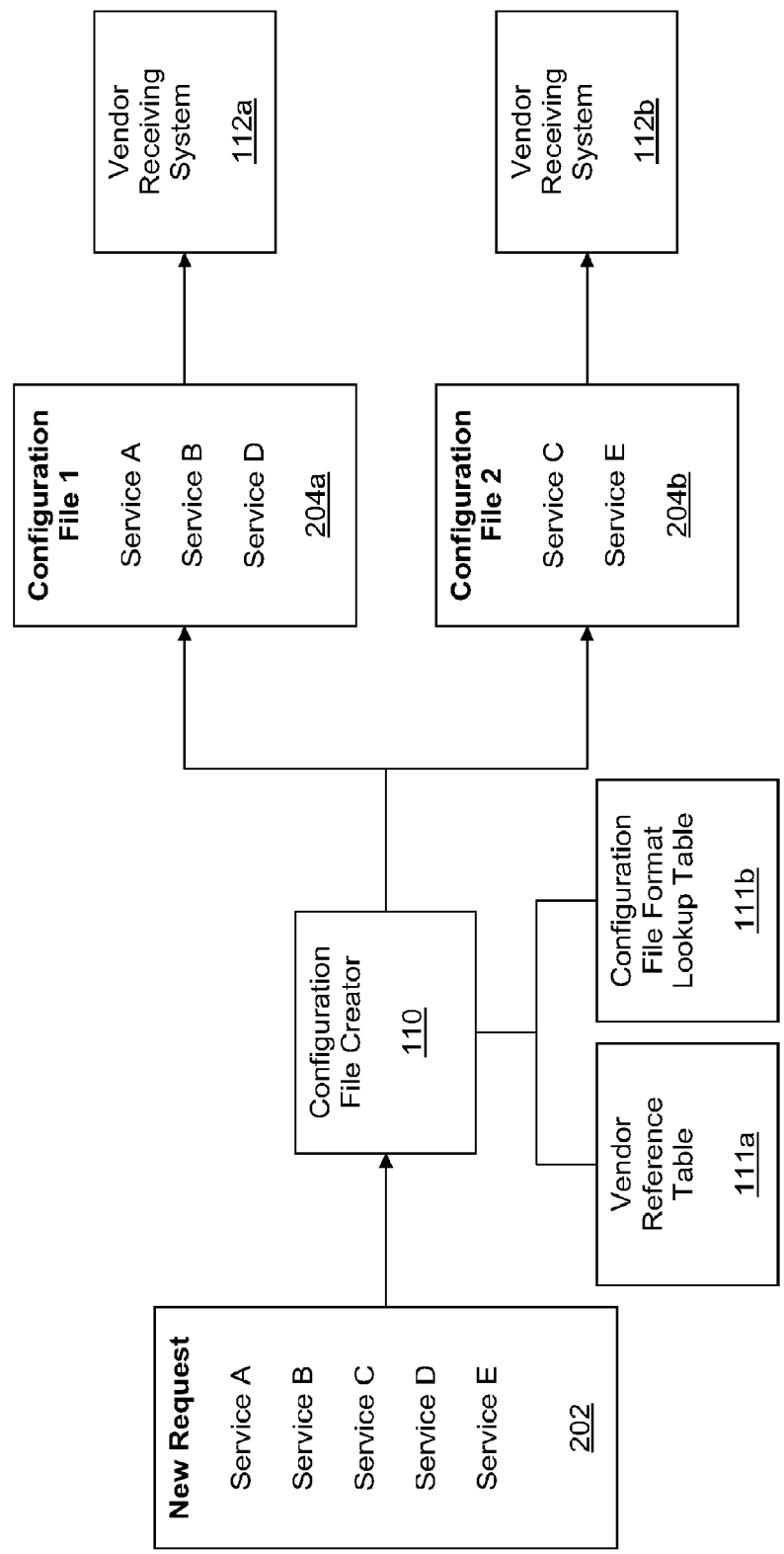
FIG. 2 shows an exemplary configuration file creator in accordance with at least some embodiments.

FIG. 2 shows an exemplary embodiment of the configuration file creator 110 processing a new request 202. The new request 202 is for services A, B, C, D and E. As explained above, in this context, services refer to parts, services, or other purchasable items for use in various wellsite systems. The configuration file creator 110 receives or retrieves the new request 202 from the data store 106 shown in FIG. 1. In FIG. 2, two vendor receiving systems 112a, 112b are shown. Each receiving system 112a, 112b provides different services to the services requestor 102. The configuration file creator 110 determines which of the services A-E of the new request 202 correspond to each receiving system 112a, 112b (e.g., by accessing a vendor reference table 111a that specifies the services provided by each receiving system 112a, 112b). In this case, services A, B and D are provided by receiving system 112a and services C and E are provided by receiving system 112b.

When the configuration file creator 110 determines the receiving systems affected by the new request 202, the configuration file creator 110 determines the appropriate configuration file format for each affected receiving system 112a, 112b. For example, the configuration file creator 110 accesses a configuration file format lookup table 111b that specifies the preferred configuration file format for each receiving system 112a, 112b. The configuration file creator 110 then creates an appropriately formatted configuration file 204a, 204b for each receiving system 112a, 112b. In this case, the configuration file 204a is formatted for the receiving system 112a and contains formatted requests for services A, B and D (i.e., the services provided by the receiving system 112a). Similarly, the configuration file 204b is formatted for the receiving system 112b and contains formatted requests for services C and E (i.e., the services provided by the receiving system 112b). In some embodiments, the receiving systems 112a, 112b access the configuration files 204a, 204b by logging into an application (e.g., a webpage provided through a standard web browser) and providing credentials to authenticate the identity of the receiving system 112a, 112b to prevent unauthorized access to the system 100. Subsequently, the receiving system 112a, 112b retrieving its associated configuration file 204a, 204b causes the request associated with the configuration file 204a, 204b to be processed by the receiving system 112a, 112b (e.g., is automatically entered into the order processing system of the receiving system 112a, 112b). The receiving system 112a, 112b may continually or periodically check the configuration file creator 110 for newly-generated configuration files for that receiving system.

Referring to FIGS. 1 and 2, and in accordance with various embodiments, when a new vendor receiving system is added or removed from the system 100, the vendor reference table 111a and the configuration file format lookup table 111b may be updated to reflect the addition or removal of a vendor and the services provided by that vendor and their configuration file format preferences. Thus, the system 100 is able to accommodate fluctuations in the needs of the services requestor 102 (e.g., a new vendor may be added if a need arises for services not provided by any current vendor). Further, if a vendor is no longer able to supply certain services, those services may be removed from that vendor's entry in the vendor reference table 111a and, if necessary, a new vendor may be added to ensure supply of those services. Similar other modifications are within the scope of the present disclosure.

Figure 3A:
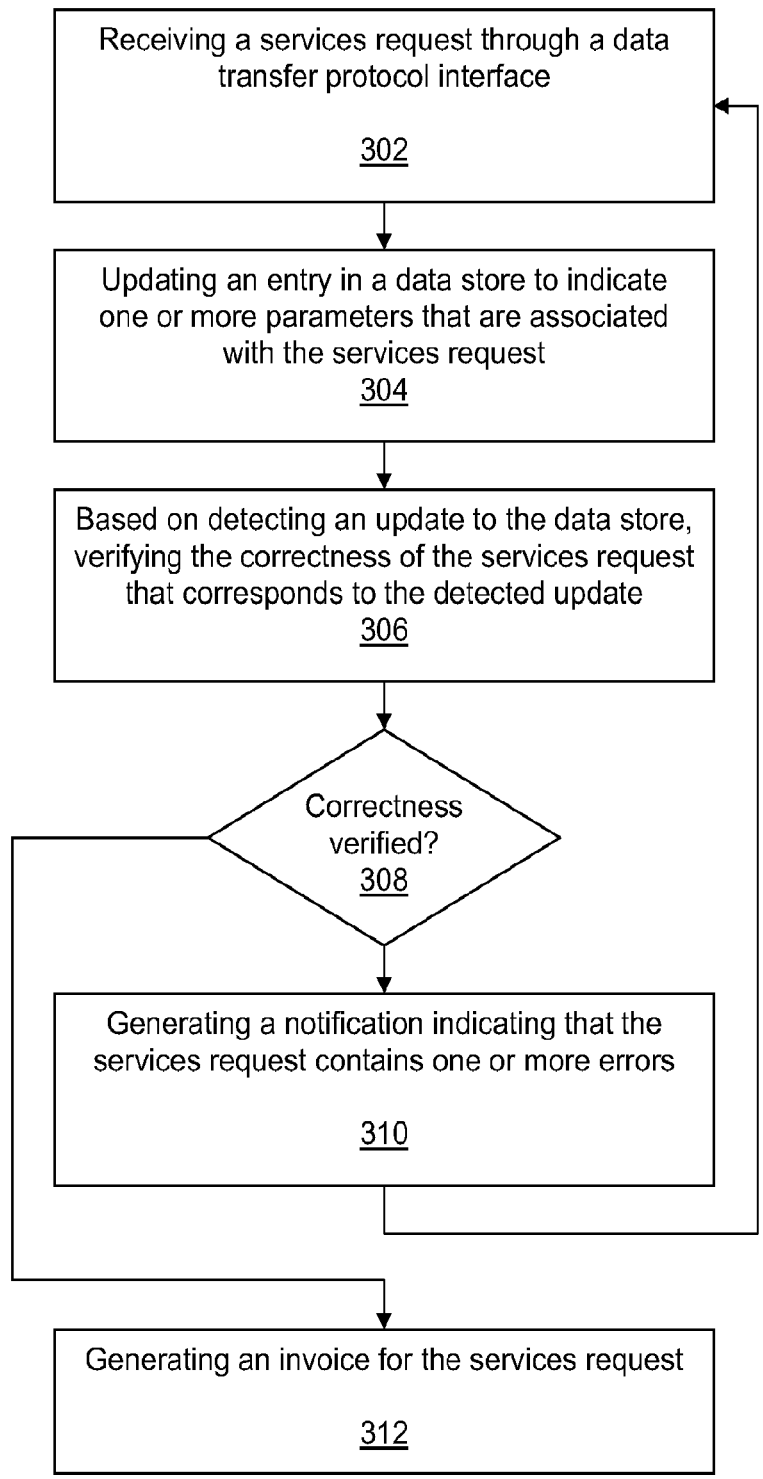
FIG. 3a shows a method in accordance with at least some embodiments.
Figure 3B:
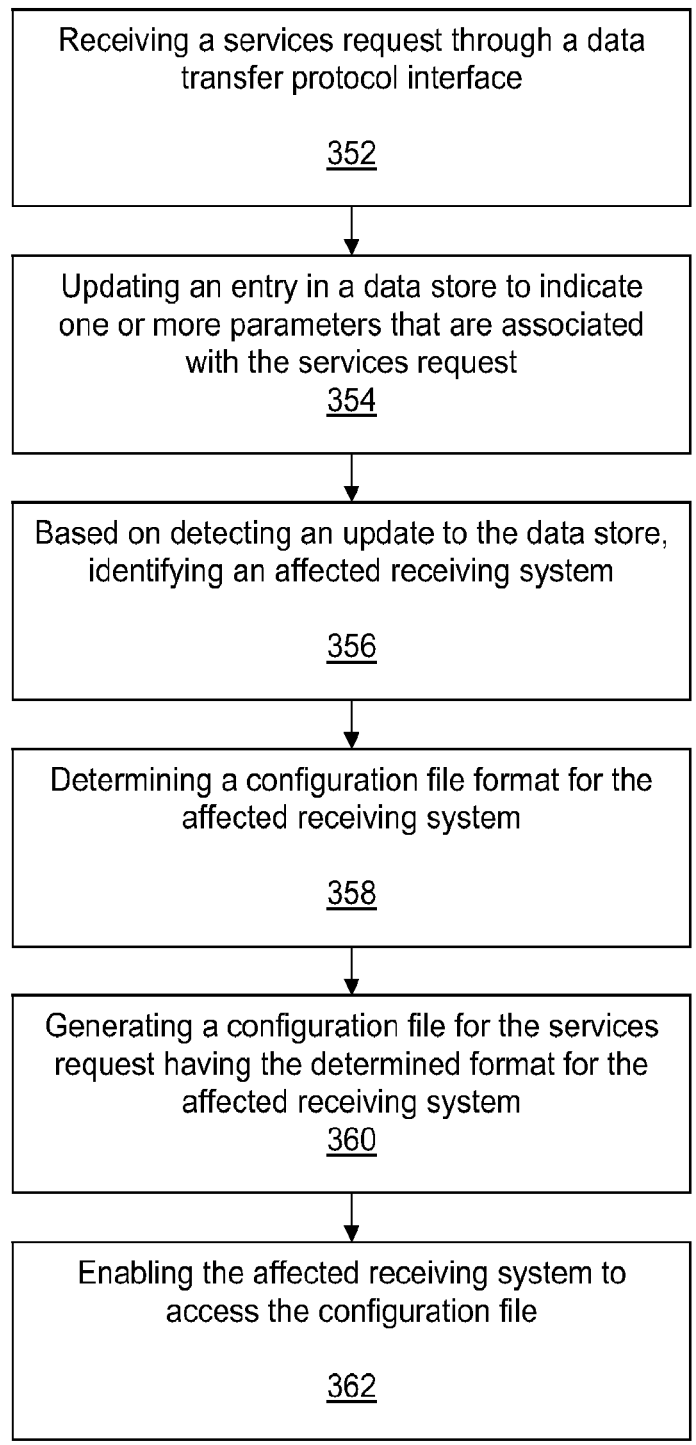
FIG. 3b shows a method in accordance with at least some embodiments.

FIGS. 3a and 3b show methods 300, 350 for facilitating a request for oilfield services using a data transfer protocol in accordance with various embodiments. Turning first to FIG. 3a, the method 300 begins in block 302 with receiving a services request through a data transfer protocol interface. The request may originate from the services requestor 102 as shown in FIG. 1 and be received by the data store 106 through the data transfer protocol interface 104. In some embodiments, the data store 106 comprises a database server, which will be further explained below. The method 300 continues in block 304 with updating an entry in a data store, such as the data store 106, to indicate one or more parameters that are associated with the services request. For example, an entry in the data store 106 may be updated to include parameters such as an identification of the wellsite, an identification of the service, a quantity requested, and the like. In some embodiments, a new entry is added to the data store 106 rather than updating an entry.

The method 300 continues in block 306 with verifying the correctness of the services request that corresponds to the detected update. In some embodiments, this step is carried out in response to detecting the update to the data store 106 (e.g., by the monitor tool 108). As explained above, the monitor tool 108 may detect that a new request has been added to the data store 106 by periodically or continually querying the data store 106. The monitor tool 108 may verify the correctness of the services request by using business rules that correspond to the particular data type of the request. For example, the services request is transformed from the data format that the services requestor 102 uses (e.g., a request for drilling services using a requestor's XML format) into a native format. This validates the request since, to correctly carry out the transformation, the data format of the original services request must be correct. Transforming the services request into the native format enables the request to be stored and understood by, for example, the data store 106 and the configuration file creator 110. In some embodiments, the monitor tool 108 monitors the wellsite system and verifies the correctness of the services request by comparing the requested services with the various components in use at the wellsite system. For example, the services request may be further validated by, for example, determining whether a proposed depth in is less than a proposed depth out, determining whether there are mnemonics for every curve request, determining whether there are one or more tools with each tool services request, determining whether each tool has an outer diameter associated with it, and the like. This validation helps to ensure that the services request is correct for the wellsite system. Certain requested services may be incompatible with the components or tools currently being used at the rig site (e.g., incorrect dimensions, incorrect tool for a particular task), and thus the services request may be at least partially erroneous. If the services request is verified, the request may be stored to the data store 106 in the native format.

If the correctness of the services request is not verified (block 308), the method 300 continues in block 310 with generating a notification indicating that the services request contains one or more errors. The monitor tool 108 that attempted to verify correctness may also generate the notification. The notification may be transmitted to the services requestor, potential receiving systems, or both. The monitor tool 108 may generate the notification via, for example, a Short Message Service (SMS) text message, an e-mail, a voice mail or the like.

If the correctness of the services request is verified (block 308), the method 300 continues in block 312 with generating an invoice for the services request. The monitor tool 108 that verified the services request may also generate the invoice or, alternately, the monitor tool 108 may cause an invoicing system to generate the invoice for the services request.

Turning now to FIG. 3b, the method 350 begins in block 352 with receiving a services request through a data transfer protocol interface and continues in block 354 with updating an entry in a data store to indicate one or more parameters that are associated with the services request. These steps are similar blocks 302 and 304 described above with respect to the method 300 of FIG. 3a. The method 350 continues in block 356 with identifying an affected receiving system. In some embodiments, this step is carried out in response to detecting the update to the data store 106 (e.g., by the configuration file creator 110).

As explained above, the configuration file creator 110 may detect that a new request has been added to the data store 106 by periodically or continually querying the data store 106. The configuration file creator 110 identifies the affected receiving system by, for example, accessing a vendor reference table (such as vendor reference table 111a of FIG. 2) that specifies the services provided by each receiving system. If the request is for services that the receiving system does not provide, then the receiving system is not affected by the new request. On the other hand, if the request is for services that the receiving system provides, then the receiving system is affected by the new request. In some embodiments, multiple receiving systems are coupled to the system 100, and thus the configuration file creator 110, and a particular request may affect more than one receiving system.

When an affected receiving system has been identified, the method 350 continues in block 358 with determining a configuration file format for the affected receiving system. The configuration file creator 110 determines a configuration file format by, for example, accessing a configuration file format lookup table (such as configuration file format lookup table 111b of FIG. 2) that specifies the preferred configuration file format for each receiving system coupled to the system 100. The method 350 the continues in block 360 with generating a configuration file for the services request. The configuration file creator 110 generates the configuration file based on the determined format from the configuration file format lookup table for the affected receiving system.

The method 350 then continues in block 362 with enabling the affected receiving system to access the configuration file. In some embodiments, the affected receiving system accesses the configuration file creator 110 (e.g., periodically or continuously) to retrieve the configuration file, while in other embodiments, the configuration file creator 110 transmits the configuration file to the receiving system. Credentials may be passed between the affected receiving system and the configuration file creator 110 to authenticate the retrieval or access of the configuration file for the affected receiving system.

The methods 300, 350 contain steps that may be performed in an order other than that which is shown in FIGS. 3a and 3b. Additionally, in some embodiments, some of the steps shown in FIGS. 3a and 3b may not be performed or may be performed optionally. All such embodiments are within the scope of this disclosure.

Figure 4:
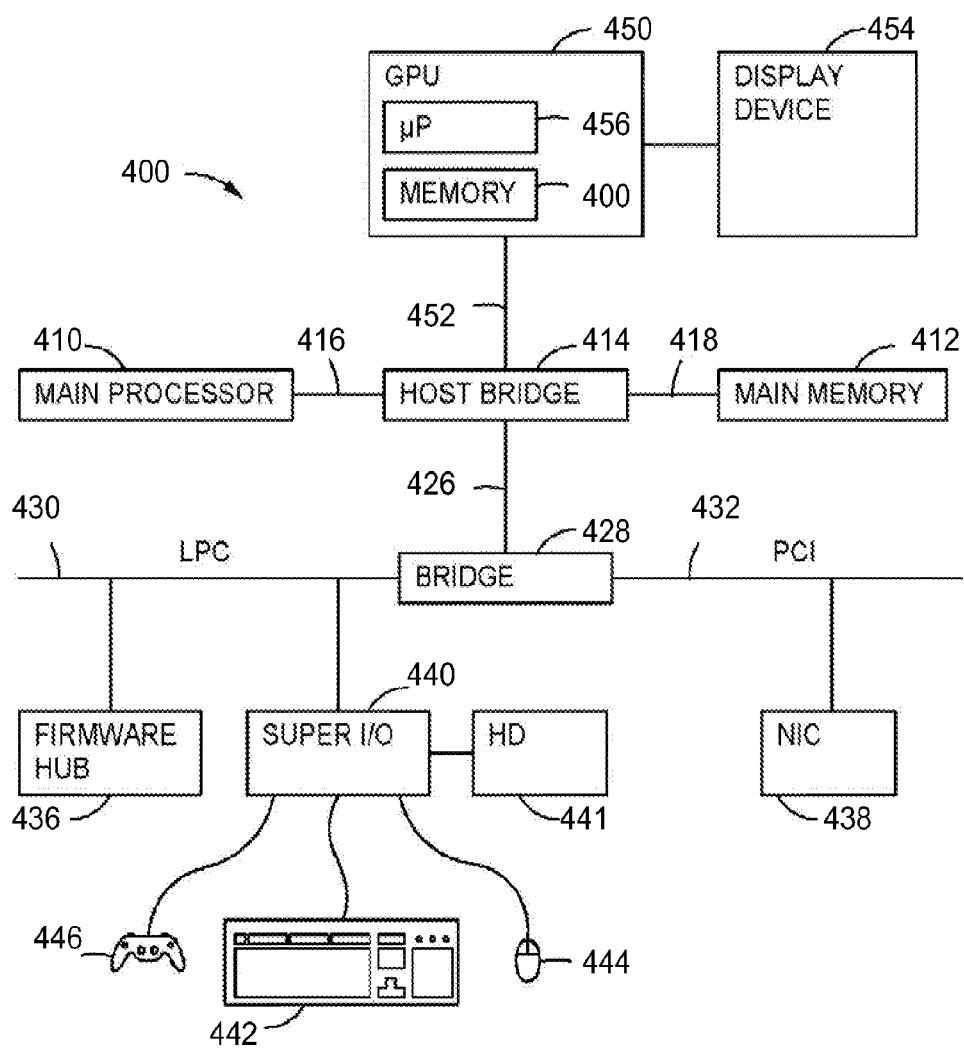
FIG. 4 shows a computer system in accordance with at least some embodiments.

FIG. 4 illustrates a computer system 400 in accordance with at least some embodiments. Although not explicitly shown in FIG. 4, the computer system 400 may comprise the data transfer protocol interface 104 and the data store 106 of FIG. 1 and provide the functionality of the monitor tool 108, the configuration file creator 110, or both. Alternately, multiple such computer systems may be in communication with each other and serve as the data store 106, the monitor tool 108, and the configuration file creator 110. Referring back to FIG. 4, computer system 400 comprises a main processor 410 coupled to a main memory array 412, and various other peripheral computer system components, through integrated host bridge 414. The main processor 410 may be a single processor core device, or a processor implementing multiple processor cores. Furthermore, computer system 400 may implement multiple main processors 410. The main processor 410 couples to the host bridge 414 by way of a host bus 416, or the host bridge 414 may be integrated into the main processor 410. Thus, the computer system 400 may implement other bus configurations or bus-bridges in addition to, or in place of, those shown in FIG. 4.

The main memory 412 couples to the host bridge 414 through a memory bus 418. Thus, the host bridge 414 comprises a memory control unit that controls transactions to the main memory 412 by asserting control signals for memory accesses. In other embodiments, the main processor 410 directly implements a memory control unit, and the main memory 412 may couple directly to the main processor 410. The main memory 412 functions as the working memory for the main processor 410 and comprises a memory device or array of memory devices in which programs, instructions and data are stored. The main memory 412 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 412 is an example of a non-transitory computer-readable medium storing programs and instructions, and other examples are disk drives and flash memory devices.

The illustrative computer system 400 also comprises a second bridge 428 that bridges the primary expansion bus 426 to various secondary expansion buses, such as a low pin count (LPC) bus 430 and peripheral components interconnect (PCI) bus 432. Various other secondary expansion buses may be supported by the bridge device 428. In accordance with some embodiments, the bridge device 428 comprises an Input/Output Controller Hub (ICH) manufactured by Intel Corporation, and thus the primary expansion bus 426 comprises a Hub-link bus, which is a proprietary bus of the Intel Corporation. However, computer system 400 is not limited to any particular chip set manufacturer, and thus bridge devices and expansion bus protocols from other manufacturers may be equivalently used.

Firmware hub 436 couples to the bridge device 428 by way of the LPC bus 430. The firmware hub 436 comprises read-only memory (ROM) which contains software programs executable by the main processor 410. The software programs comprise programs executed during and just after power on self tests (POST) procedures as well as memory reference code. The POST procedures and memory reference code perform various functions within the computer system before control of the computer system is turned over to the operating system.

The computer system 400 further comprises a network interface card (NIC) 438 illustratively coupled to the PCI bus 432. The NIC 438 acts as to couple the computer system 400 to a communication network, such the Internet.

Still referring to FIG. 4, computer system 400 may further comprise a super input/output (I/O) controller 440 coupled to the bridge 428 by way of the LPC bus 430. The Super I/O controller 440 controls many computer system functions, for example interfacing with various input and output devices such as a keyboard 442, a pointing device 444 (e.g., mouse), game controller 446, various serial ports, floppy drives and disk drives. The super I/O controller 440 is often referred to as "super" because of the many I/O functions it performs.

The computer system 400 further comprises a graphics processing unit (GPU) 450 coupled to the host bridge 414 by way of bus 452, such as a PCI Express (PCI-E) bus or Advanced Graphics Processing (AGP) bus. Other bus systems, including after-developed bus systems, may be equivalently used. Moreover, the graphics processing unit 450 may alternatively couple to the primary expansion bus 426, or one of the secondary expansion buses (e.g., PCI bus 432). The graphics processing unit 450 couples to a display device 454 which may comprise any suitable electronic display device upon which any image or text can be displayed. The graphics processing unit 450 comprises an onboard processor 456, as well as onboard memory 458. The processor 456 may thus perform graphics processing, as commanded by the main processor 410. Moreover, the memory 458 may be significant, on the order of several hundred megabytes or more. Thus, once commanded by the main processor 410, the graphics processing unit 450 may perform significant calculations regarding graphics to be displayed on the display device, and ultimately display such graphics, without further input or assistance of the main processor 410.

It is noted that while theoretically possible to perform some of the above-described data aggregation, monitoring, processing, verification and the like by a human using only pencil and paper, the time measurements for human-based performance of such tasks may range from man-days to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than an signal traveling along a conductor or carrier wave) for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a data store to receive a request for services for a wellsite system from a services requestor through a data transfer protocol interface and update an entry in the data store to indicate one or more parameters associated with the services request;
a monitor tool to detect an update to the data store that corresponds to the request for services and, if an update is detected, to verify the correctness of the request based on the services requested for the particular wellsite system; and
a configuration file creator to detect an update to the data store that corresponds to the request for services and, if an update is detected, to identify an affected receiving system of a vendor that provides one or more of the services requested for the wellsite system, determine a configuration file format for the vendor's affected receiving system, and generate a configuration file including a formatted request for each of the one or more requested services provided by the vendor, in accordance with the configuration file format determined for the vendor's affected receiving system.

2. The system of claim 1 wherein the data transfer protocol comprises wellsite information transfer standard markup language (WITSML).

3. The system of claim 1 wherein the monitor tool determines compatibility of the requested services with one or more components of the particular wellsite system to verify the correctness of the services request.

4. The system of claim 1 wherein the monitor tool transmits a notification to the services requestor indicating that the services request contains an error if the monitor tool fails to verify the correctness of the services request.

5. The system of claim 1 wherein the monitor tool generates an invoice for the services request as a result if the monitor tool successfully verifies the correctness of the services request.

6. The system of claim 1 wherein the configuration file creator comprises a reference table that specifies services provided by each of a plurality of receiving systems corresponding to different vendors, and the configuration file creator uses the reference table to identify the affected receiving system of the vendor as one of the plurality of receiving systems in the reference table that provides one or more of the services requested for the wellsite system.

7. The system of claim 1 wherein the configuration file creator comprises a configuration file format table that specifies a request format for each of a plurality of receiving systems corresponding to different vendors, the configuration file format being the request format specified by the configuration file format table for the affected receiving system of the vendor that provides one or more of the services requested for the wellsite system.

8. A method, comprising:
receiving a request for services for a wellsite system through a data transfer protocol interface;
updating an entry in a data store to indicate one or more parameters associated with the services request;
detecting an update to the data store that corresponds to the request for services and, based on detecting the update, verifying the correctness of the request based on the services requested for the particular wellsite system;
when the verification of the correctness of the request fails, generating a notification indicating that the services request contains an error; and
when the verification of the correctness of the request is successful, generating a configuration file including a formatted request for each of the services according to a configuration file format associated with a receiving system of a vendor that provides that service.

9. The method of claim 8 wherein verifying the correctness comprises determining compatibility of the requested services with one or more components of the particular wellsite system.

10. The method of claim 8 wherein generating a notification comprises generating at least one selected from the group consisting of a Short Message Service (SMS) message, an e-mail, and a voice mail.

11. The method of claim 8 further comprising generating an invoice for the services request as a result of successfully verifying the correctness of the services request.

12. A method, comprising:
receiving a request for services for a wellsite system through a data transfer protocol interface;
updating an entry in a data store to indicate one or more parameters associated with the services request;
detecting an update to the data store that corresponds to the request for services and, based on detecting the update, verifying the correctness of the request based on the services requested for the particular wellsite system;
upon successfully verifying the correctness of the request, identifying an affected receiving system of a vendor that provides one or more of the requested services;
determining a configuration file format for the affected receiving system; and
generating a configuration file including a formatted request for each of the one or more requested services provided by the vendor, in accordance with the configuration file format determined for the vendor's affected receiving system.

13. The method of claim 12 further comprising enabling the affected receiving system to access the configuration file.

14. The method of claim 12 wherein identifying an affected receiving system comprises accessing a reference table that specifies services provided by each of a plurality of receiving systems corresponding to different vendors, and the affected receiving system of the vendor is identified as one of the plurality of receiving systems in the reference table that provides one or more of the services requested for the wellsite system.

15. The method of claim 12 wherein determining a configuration file format comprises accessing a configuration file format table that specifies a request format for each of a plurality of receiving systems corresponding to different vendors, the configuration file format being the request format specified by the configuration file format table for the affected receiving system of the vendor that provides one or more of the services requested for the wellsite system.

16. A computer system, comprising:
a processor; and
a memory coupled to the processor;
wherein the memory stores a program that, when executed by the processor, causes the processor to:
detect an update to an entry of a data store that corresponds to a request for services for a wellsite system, and, based on detecting the update, verify the correctness of the request based on the services requested for the particular wellsite system;
upon successful verification of the correctness of the request, identify an affected receiving system of a vendor that provides one or more of the requested services, wherein the detected update in the data store indicates one or more parameters associated with a services request;
determine a configuration file format for the affected receiving system; and
generate a configuration file including a formatted request for each of the one or more requested services provided by the vendor, in accordance with the configuration file format determined for the vendor's affected receiving system.

17. The computer system of claim 16 wherein the program further causes the processor to enable the affected receiving system to access the configuration file.

18. The computer system of claim 16 wherein when the processor identifies an affected receiving system, the program further causes the processor to access a reference table that specifies services provided by each of a plurality of receiving systems corresponding to different vendors, and the affected receiving system of the vendor is identified as one of the plurality of receiving systems in the reference table that provides one or more of the services requested for the wellsite system.

19. The computer system of claim 16 when the processor determines a configuration file format, the program further causes the processor to access a configuration file format table that specifies a request format for each of a plurality of receiving systems corresponding to different vendors, the configuration file format being the request format specified by the configuration file format table for the affected receiving system of the vendor that provides one or more of the services requested for the wellsite system.

* * * * *